United States Patent [19]

Kunikane et al.

[11] Patent Number: 4,970,502

[45] Date of Patent: Nov. 13, 1990

[54] RUNNING CHARACTER DISPLAY

[75] Inventors: Akihiko Kunikane; Shintaro Hashimoto, both of Ikoma; Satoshi Teramura, Kashihara; Kunihiro Kobayashi, Kyoto; Tetsuo Iwase, Nara, all of Japan

[73] Assignee: Sharp Kabushiki Kaisha, Osaka, Japan

[21] Appl. No.: 792,169

[22] Filed: Oct. 25, 1985

Related U.S. Application Data

[63] Continuation of Ser. No. 181,415, Aug. 26, 1980, abandoned.

[30] Foreign Application Priority Data

| | | | |
|---|---|---|---|
| Aug. 27, 1979 | [JP] | Japan | 54-109570 |
| Aug. 27, 1979 | [JP] | Japan | 54-109571 |
| Sep. 7, 1979 | [JP] | Japan | 54-115483 |

[51] Int. Cl.[5] .......... G05B 41/44

[52] U.S. Cl. .......... 340/792; 364/900; 364/927.5; 364/947.6

[58] Field of Search .......... 340/792, 798; 364/200 MS File, 900 MS File

[56] References Cited

U.S. PATENT DOCUMENTS

| | | | |
|---|---|---|---|
| 3,432,846 | 3/1969 | Jones et al. | 340/792 X |
| 3,493,956 | 2/1970 | Andrews et al. | 340/771 X |
| 3,868,675 | 2/1975 | Firmin | 340/792 X |
| 3,925,775 | 12/1975 | Gay | 340/803 X |
| 4,005,388 | 1/1977 | Morley et al. | 364/200 |
| 4,024,531 | 5/1977 | Ashby | 340/792 X |
| 4,205,312 | 5/1980 | Nelson | 340/792 |

OTHER PUBLICATIONS

Medical and Biological Engineering, "An Alphanumeric Display as a Communication Aid for the Dumb", Newell et al., Jan. 1975, pp. 84–88.

*Primary Examiner*—Eddie P. Chan

[57] ABSTRACT

A dot matrix type liquid crystal display panel is used with a central processor unit for displaying a message longer than the capacity of the display panel. The beginning portion of the message of a length equal to the capacity of the display panel is first displayed at one time and held on the display panel for a limited length of time facilitating the viewers' recognition of the meaning of the message. When the repeated display of the message is desired, the display state where the end of the message is in alignment with the last digit position of the display panel is held for a given length of time. The first and final holdings of the message results in enhancing legibility of the display contents on the panel.

1 Claim, 10 Drawing Sheets

(a)

| | | | |
|---|---|---|---|
| 0 | ···0000 | 9 | ···1001 |
| 1 | ···0001 | A | ···1010 |
| 2 | ···0010 | B | ···1011 |
| 3 | ···0011 | C | ···1100 |
| 4 | ···0100 | D | ···1101 |
| 5 | ···0101 | E | ···1110 |
| 6 | ···0110 | F | ···1111 |
| 7 | ···0111 | | |
| 8 | ···1000 | | |

(b)

RUNNING CHARACTER DISPLAY

This application is a continuation of application Ser. No. 181,415, filed on Aug. 26, 1980, now abandoned.

BACKGROUND OF THE INVENTION

This invention relates to a display device for use in a wide variety of electronic devices such as electronic calculators, and more particularly to a display device suitable for providing a visual display of a message including letters, symbols, numbers, etc., and having a length more than the capacity of a display panel.

In the past, when it was desired to display a message of a length more than the capacity of a display panel, the message should be split into more than one group in advance and displayed by groups. However, the prior art did not appreciate the difficulty in understanding such a fragmented message on the display panel.

OBJECTS AND SUMMARY OF THE INVENTION

It is therefore an object of the present invention to provide a new and effective display device for facilitating recognition of character messages even when these messages are longer than a display panel.

BRIEF DESCRIPTION OF THE DRAWINGS

For a more complete understanding of the present invention and for further objects and advantages thereof, reference is now made to the following description taken in conjunction with the accompanying drawings, in which:

FIGS. 4, 4A, 4B, 4C and 4D are schematic block diagrams of a typical central processor unit (CPU);

DETAILED DESCRIPTION OF THE PREFERRED EMBODIMENT

Figure 1:
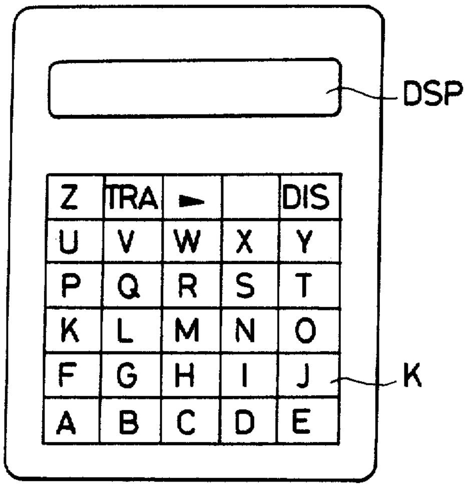
FIG. 1 is a front view of an electronic dictionary to which a display device according to the present invention is applied.

Attention is first called to FIG. 1, there is illustrated a front view of an electronic dictionary with a display device DSP constructed according to the present invention which provides a visual display of words introduced via a keyboard K.

Figure 2:
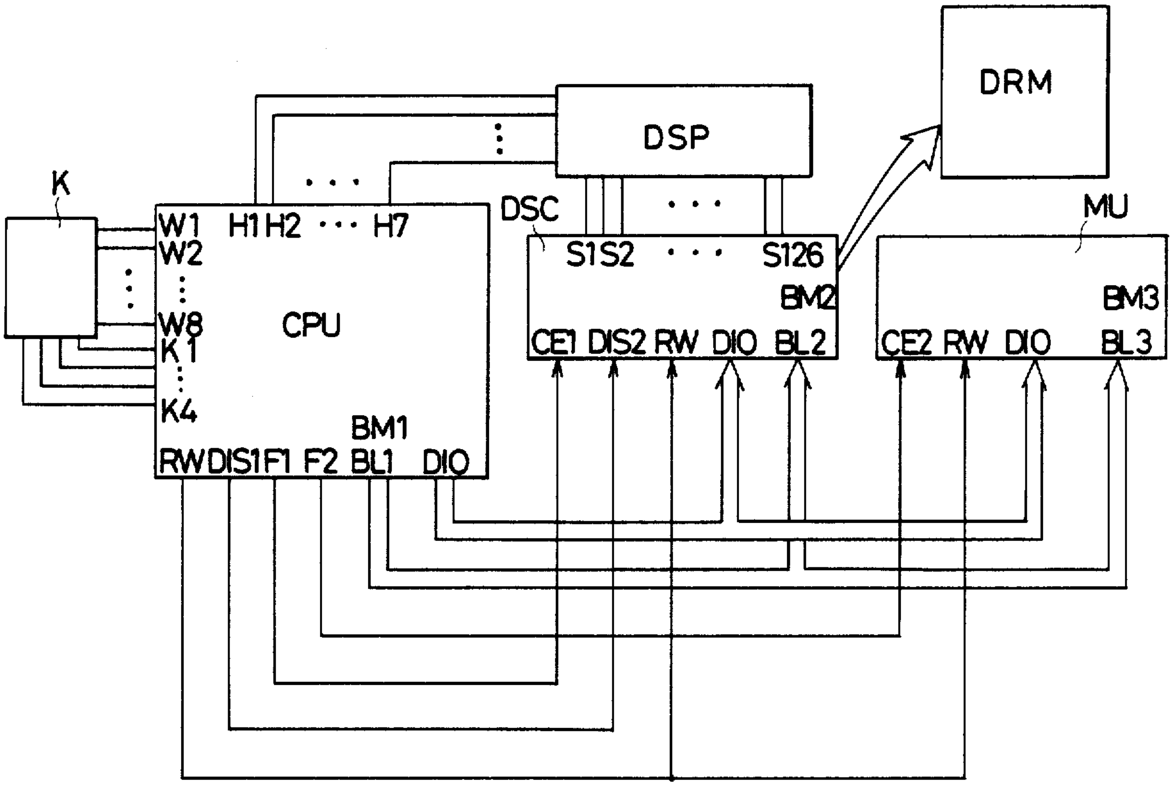
FIG. 2 is a schematic block diagram of a display device constructed according to one preferred form of the present invention.
Figure 4A:
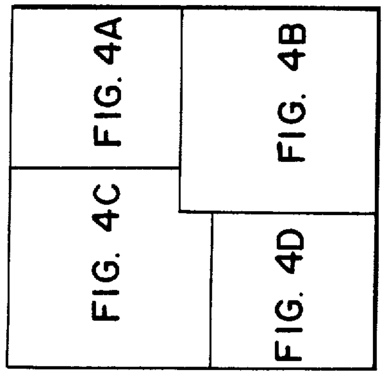
Figure 4A:
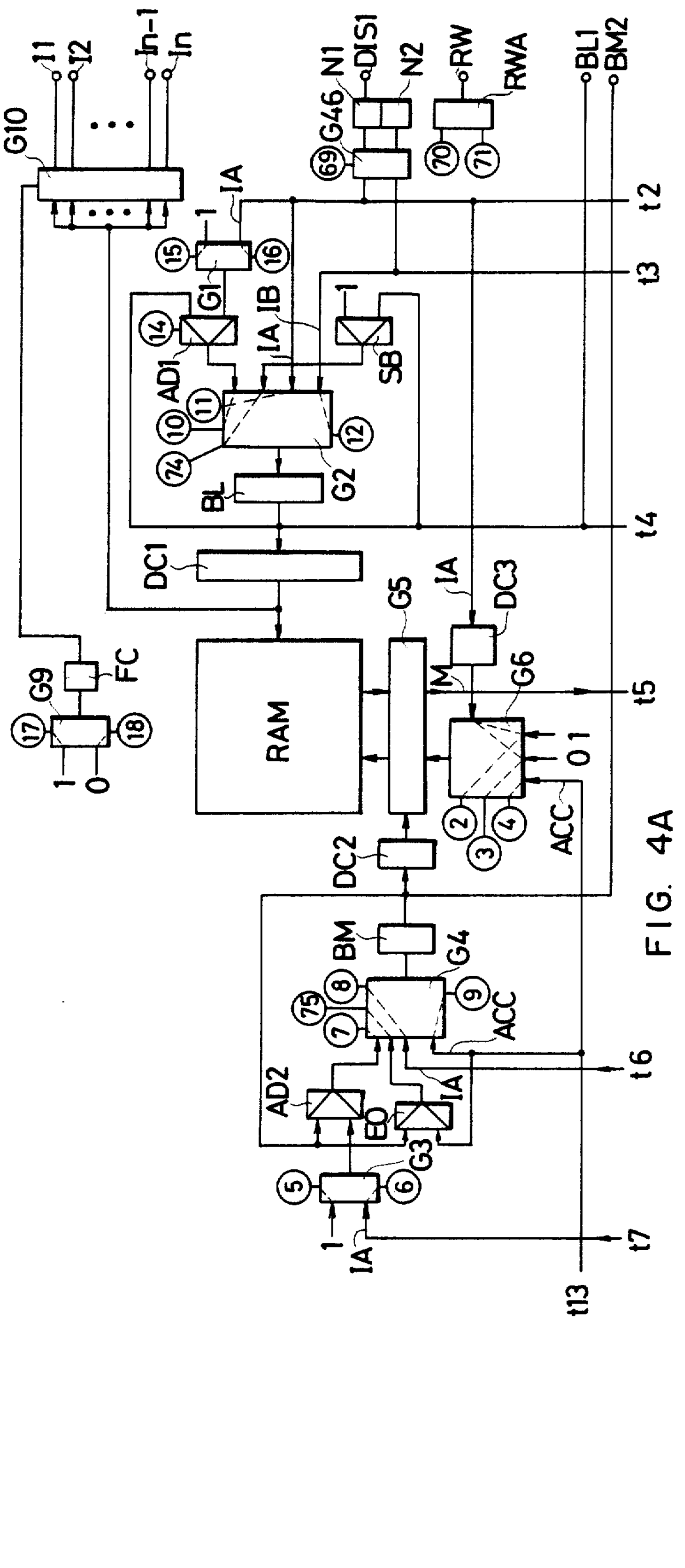
Figure 4B:
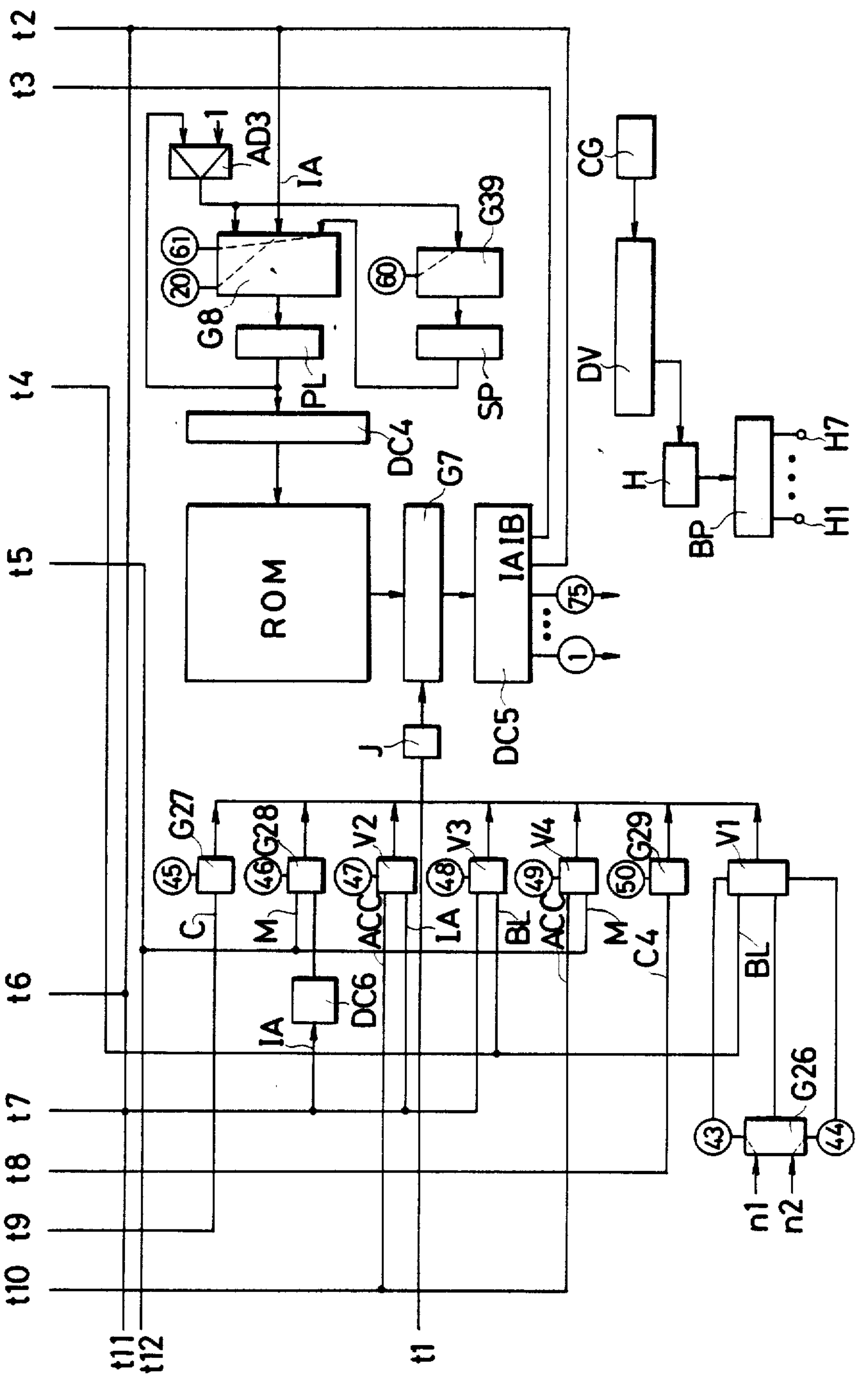
Figure 4C:
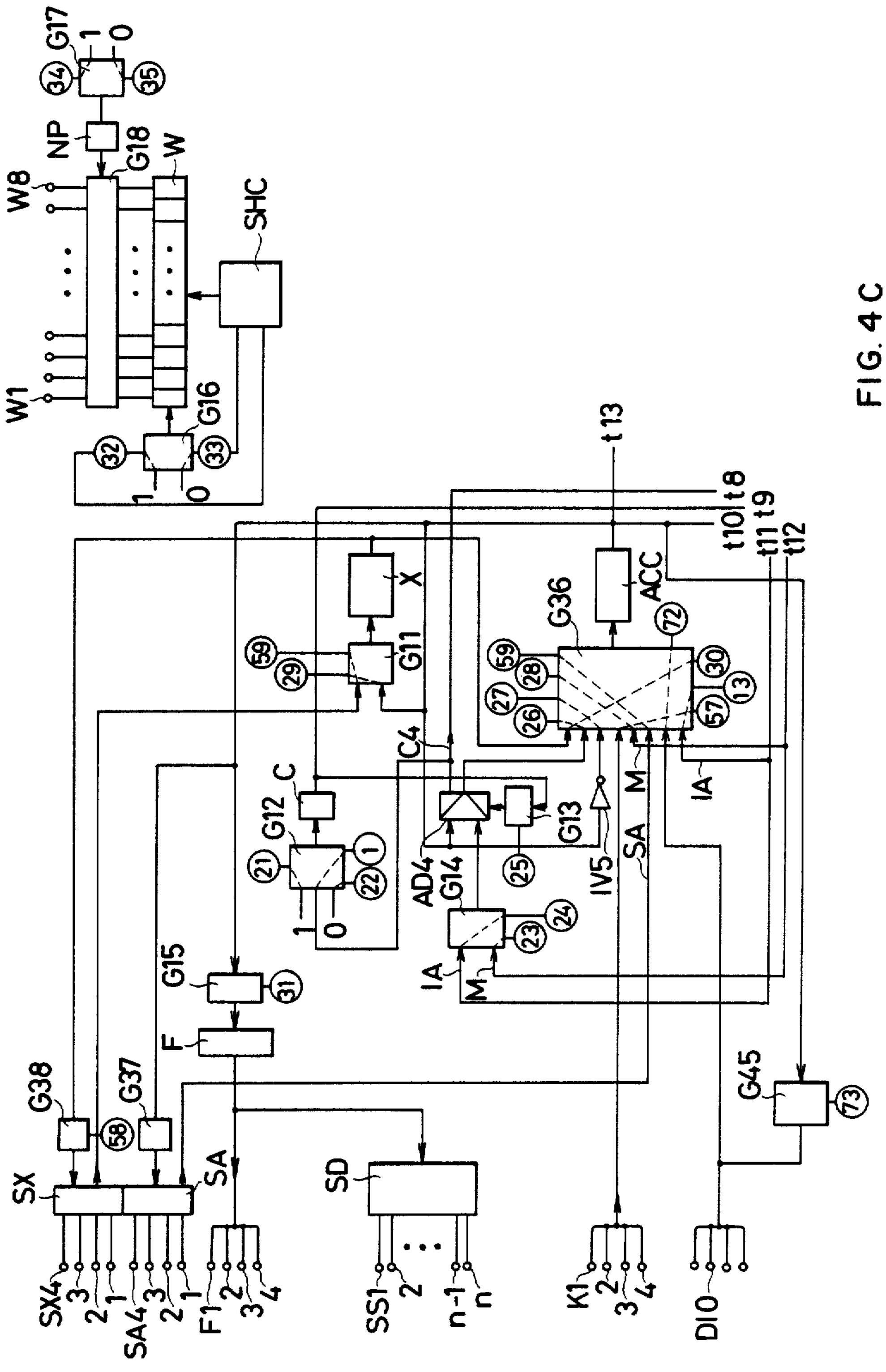
Figure 4D:
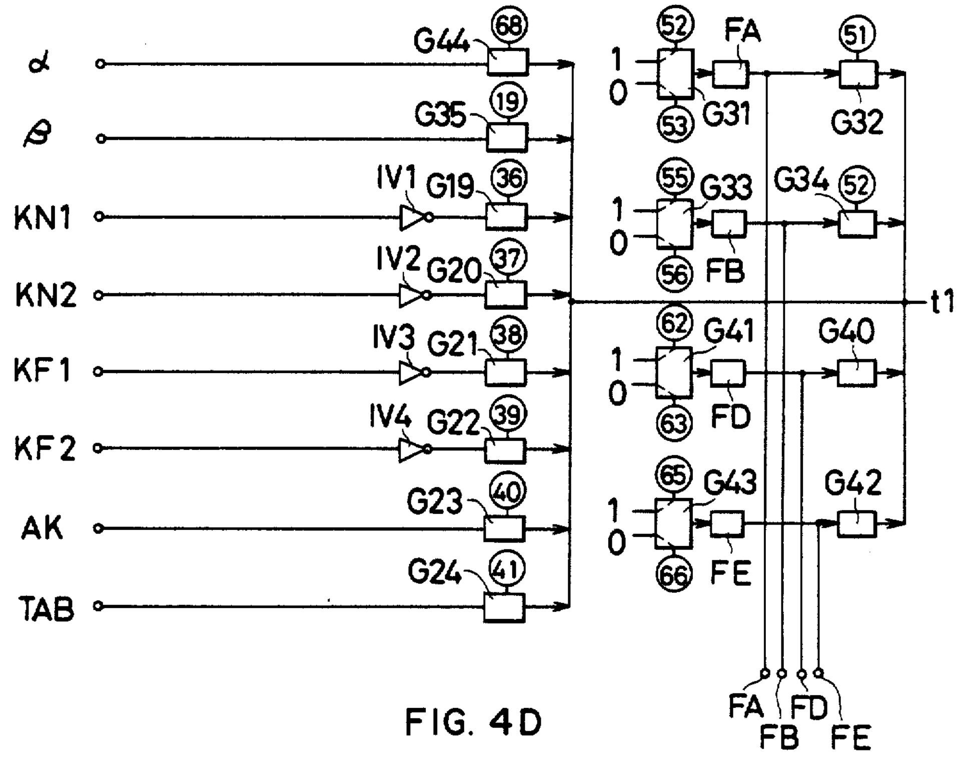

FIG. 2 is a schematic block diagram of the electronic dictionary shown in FIG. 1. The keyboard K, the display panel DSP, display control circuitry DSC and an external memory unit MU are all operatively connected to a central processor unit CPU. By supplying key strobe signals from key strobe output terminals W1-W8 electric representations of selected ones of keys on the keyboard K are derived from the keyboard K and fed into key input terminals K1-K4 of the CPU. The display panel DSP is typically a 12-digit dot matrix type liquid crystal display panel each digit having a given number of segment electrodes and a common opposite electrode. The display panel DSP receives opposite electrode select signals from output terminals H1-H7 of the central processor unit CPU and segment select signals from output terminals S1-S126 of the display control circuitry DSC for displaying purposes. As will be more clear hereinafter, signals developing at memory address output terminals BM1 and BL1 of the CPU are fed into memory digit address input terminals BL2 and BL3 of the display control circuitry DSC and the external memory unit MU and memory file address input terminals BM2 and BM3, respectively. Lines leading from these terminals BM1-BM3 and BL1-BL3 are shown as buses in FIG. 2 for the sake of simplicity only. A display/disable signal DIS from a display/disable signal output terminal DIS1 of the CPU is applied to a display/disable signal input terminal DIS2 of the display control circuitry DSC. The effect of the display/-disable signal is to control the display operation of the display panel DSP. The central processor unit CPU, the display control circuitry DSC and the external memory unit MU are coupled together through data input and output terminals generally designated DIO for the sake of simplicity only. These circuit components are further coupled together through a read/write signal terminal generally designated RW. Signals at specific bit cells F1 and F2 of an output buffer register F within the central processor unit CPU are fed into a chip select signal input terminal CE1 of the display control circuitry DSC and the counterpart CE2 of the external memory unit MU so that either the display control circuitry DSC or the external memory unit MU may be made operative depending on the contents of the specific bit cells F1 and F2 of the output buffer register F (see FIG. 4). The external memory unit MU may comprise a well known random access memory. The display control circuitry DSC includes a display data storage DRM set up of a random access memory.

Figure 3:
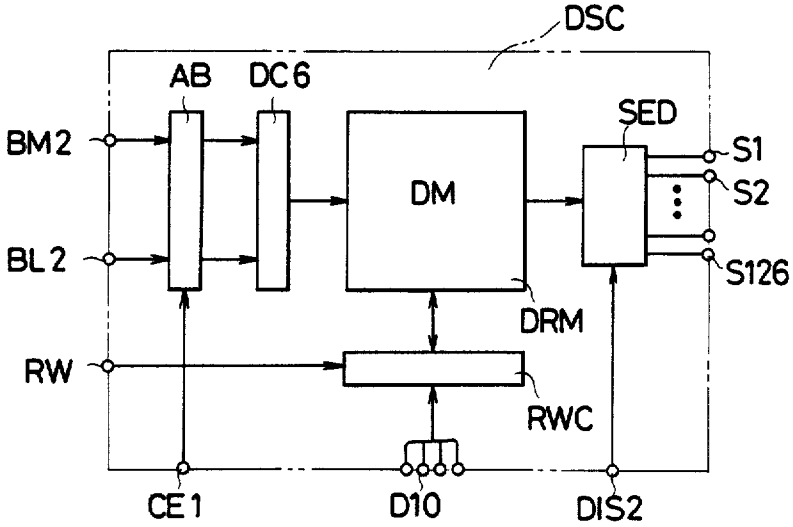
FIG. 3 is a block diagram showing display control circuitry DSC in more detail.

The display control circuitry DSC is best shown in FIG. 3, wherein the display data storage DRM is connected to an address decoder DC6 which decodes information sent from the memory digit address output terminal BL1 and the memory digit address output terminal BM1 of the central processor unit CPU to its input terminals BL2 and BM2 via an address buffer AB A read/write control circuit RWC allows information to be read from or written in the display data storage DRM via the data input and output terminals DIO in response to a read/write signal from the read/write terminal RW. The display data storage DRM has a display store segment of a up to 12 digit capacity which permits the display panel to display 12 digits of information at the same time. The contents of the display segment DM are supplied to a segment driver SED The respective digit positions of the display panel DSP are enabled with signals appearing at the output terminals S1-S126. The segment driver SED delivers so-called enable waveform signals to enable the display panel DSP when the display/disable control signal DIS assumes a logic "1" level, and so-called disable waveform signals to disable the the display panel DSP when the same assumes a logic "0" level.

FIG. 4, a composite diagram of FIGS. 4A-4D, shows a logic wiring diagram of a typical example of the CPU sheme in the dictionary whereby the display operation of the present invention is effected. It is understood that the illustrated CPU architecture is designed for general purposes and some of its functions are not concerned with the present invention.

CPU ARCHITECTURE

A random access memory RAM is of a 4 bit input and output capacity and accessible to any specific digit position thereof as identified by a digit address and a file address. The RAM includes a digit address counter with its output terminal BL1, a digit address decoder $DC_1$, a file address counter BM with its output terminal BM1, a file address decoder $DC_2$ and an adder $AD_1$ which serves as an adder and a subtractor respectively in the absence and presence of a control instruction 14. It further includes a second adder $AD_2$ and a gate $G_1$ for providing either a digit "1" or an operand $I_A$ to an input to the adder/subtractor $AD_1$ and delivering 1 or $I_A$ when a control instruction 15 or 16 is developed, respectively. The memory digit address counter BL has a countdown circuit SB. An input gate $G_2$ is provided for the memory digit address counter BL, which enables the output of the adder/subtractor $AD_1$, the operand $I_A$, the other operand $I_B$ and the output of the countdown circuit SB to pass therethrough respectively when control instruction 10, 11, 12 and 74 are developed. A gate $G_3$ is disposed to provide a digit "1" or the operand $I_A$ to an input to the adder/subtractor $AD_2$, the former being provided upon the development of an instruction 5 and the latter upon the development of an instruction 6. A circuit EO supplies to a gate $G_4$ an exclusive OR sum of the both counts of the memory file address counter BM and the accumulator ACC. The gate $G_4$ is an input gate to the memory file address BM which enables the output of the adder $AD_2$, the operand $I_A$, the contents of an accumulator ACC and the output of EO to pass upon the development of instructions 7, 8, 9 and 85. A file selection gate $G_5$ is further provided for the memory RAM. A decoder $DC_3$ translates the operand $I_A$ and supplies a gate $G_6$ with a desired bit specifying signal. The gate $G_6$ is an input gate to the memory RAM and contains a circuit arrangement for introducing a binary code "1" into a specific bit position of the memory RAM identified by the operand decoder $DC_3$ and a binary code "0" into a specific bit position of the memory RAM identified by $DC_3$, respectively, when a control instruction 2 or 3 is developed. Upon the development of an instruction 4 the contents of the accumulator ACC are read out. There are further provided display controlling flags $N_1$ and $N_2$. An input gate $G_{46}$ to $N_1$ and $N_2$ is enabled with 69. A read/write circuit RWA with an output terminal RW directs read and write operations in response to 70 and 71, respectively.

A read only memory ROM has its associated program counter PL which specifies a desired step in the read only memory ROM. The read only memory ROM further contains a step access decoder $DC_4$ and an output gate $G_7$ which shuts off transmission of the output of the ROM to an instruction decoder $DC_5$ when a judge flip flop F/F J is set. The instruction decoder $DC_5$ is adapted to decode instruction codes derived from the ROM and divide them into an operation code area $I_O$ and operand areas $I_A$ and $I_B$, the operation code being decoded into any one of the control instruction 1-75. The decoder $DC_5$ is further adapted to output the operand $I_A$ or $I_B$ as it is when sensing an operation code accompanied by an operand. An adder $AD_3$ increments the contents of the program counter PL by one. An input gate $G_8$ associated with the program counter PL provides the operand $I_A$ and transmits the contents of a program stack register SP when the instructions 20 and 61 are developed, respectively. When the instructions 20, 61 and 60 are being processed, any output of the adder $AD_3$ is not transmitted. Otherwise the $AD_3$ output is transmitted to automatically load "1" into the contents of the program counter PL. A flag flip flop FC has an input gate $G_9$ therefor which introduces binary codes "1" and "0" into the flag flip flop FC when the instructions 17 and 18 are developed, respectively. A key signal generating gate $G_{10}$ provides the output of the memory digit address decoder $DC_1$ without any change when the flag F/F FC is in the reset state (0), and renders all outputs $I_1$-$I_n$ "1" whatever output $DC_1$ provides when FC is in the set state (1). There are further provided a clock generator CG, a divider DV, a displaying counter H and an opposite electrode select signal generator BP for the liquid crystal display panel with opposite electrode signal output terminals $H_1$-$H_7$. The accumulator ACC is 4 bits long and a temporary register X is also 4 bits long. An input gate $G_{11}$ for the temporary register X transmits the contents of the accumulator ACC and the stack register SX respectively upon the development of the instructions ㉙ and ㊾.

An adder $AD_4$ executes binary addition on the contents of the accumulator ACC and other data. The output $C_4$ of the adder $AD_4$ assumes "1" when the most significant bit or fourth bit binary addition yields a carry. A carry F/F C has its associated input gate $G_{12}$ which sets "1" into the carry F/F C in the presence of "1" of the fourth bit carry $C_4$ and "0" into the same in the absence of $C_4(0)$. "1" and "0" are set into C upon the development of ㉑ and ㉒, respectively. A carry (C) input gate $G_{13}$ enables the adder $AD_4$ to perform binary addition with a carry and thus transmits the output of the carry F/F C into the adder $AD_4$ in response to the instruction ㉕. An input gate $G_{14}$ is provided for the adder $AD_4$ and transfers the output of the memory RAM and the RAM and the operand $I_A$ upon the development of ㉓ and ㉔, respectively. An output buffer register F has a 4 bit capacity and an input gate which enables the contents of the accumulator ACC to enter into F upon the development of ㉛. An output decoder SD decodes the contents of the output buffer F into display segment signals $SS_1$-$SS_n$. An output buffer register W has a shift circuit SHC which shifts the overall bit contents of the output buffer register W one bit to the right at a time in response to ㉜ or ㉝. An input gate $G_{16}$ for the output buffer register W leads "1" and "0" into the first bit position of W upon ㉜ and ㉝, respectively. Immediately before "1" or "0" enters into the first bit position of W the output buffer shift circuit SHC becomes operative.

An output control flag F/F NP has an input gate $G_{17}$ for receiving "1" and "0" upon the development of ㉞ and ㉟, respectively.

The buffer register W is provided with an output control gate $G_{18}$ for providing the respective bit outputs thereof at one time only when the flag F/F NP is in the set state (1). The outputs of the output buffer register W are available as key strobe signals. There are further provided a judge F/F J. inverters $IV_1$-$IV_4$ and an input gate $G_{19}$ to the judge F/F J for transferring the state of an input $KN_1$ into J upon the development of (36). In the case where $KN_1=0$, $J=1$ because of intervention of the inverter $IV_1$. An input gate $G_{20}$ to the judge F/F J is adapted to transfer the state of an input $KN_2$ into J upon (37). It is noted that, when $KN_2=0$, $J=1$ via the inverter $IV_2$. An input gate $G_{21}$ to the judge F/F J is adapted to transfer the state of the input $KF_1$ into J upon (38). When $KF_1=0$, $J=1$ because of intervention of the inverter $IV_3$. An input gate $G_{22}$ to the judge F/F J is adapted to transfer the state of the input $KF_2$ into J upon (39). When $KF_2=0$, $J=1$ because of the intervened inverter $IV_4$. An input gate $G_{23}$ is provided for the judge flip flop J for transmission of the state of an input AK into J upon the development of (40). When $AK=1$, $J=1$. An input gate $G_{24}$ is provided for the judge flip flop J to transmit the state of an input TAB into J pursuant to (41). When $TAB=1$, $J=1$. A gate $G_{28}$ is provided for setting the judge F/F J upon the development of (46). A comparator $V_1$ compares the contents of the memory digit address counter BL with preselected data and provides an output "1" if there is agreement. The comparator $V_1$ becomes operative when (43) or (44) is developed. The data to be compared are derived from a gate $G_{26}$ which is an input gate to the comparator $V_1$. The data $n_1$ to be compared are a specific highter address value which is often available in controlling the RAM. A comparison input gate $G_{26}$ provides $n_1$ and $n_2$ for comparison purposes upon the development of (43) and (44), respectively.

An input gate $G_{27}$ is provided for the decision F/F J to enter "1" into J when the carry F/F C assumes "1" upon the development of (45).

A decoder $DC_6$ decodes the operand $I_A$ and helps decisions as to whether or not the contents of a desired bit position of the RAM are "1". A gate $G_{28}$ transfers the contents of the RAM as specified by the operand decoder $DC_6$ into the judge F/F when (46) is derived. When the specified bit position of the RAM assumes "1", $J=1$. A comparator $V_2$ decides whether or not the contents of the accumulator ACC are equal to the operand $I_A$ and provides an output "1" when the affirmative answer is provided. The comparator $V_2$ becomes operative according to (47). A comparator $V_3$ decides under (48) whether the contents of the memory digit address counter BL are equal to the operand $I_A$ and provides an output "1" when the affirmative answer is obtained. A comparator $V_4$ decides whether the contents of the accumulator ACC agree with the contents of the RAM and provides an output "1" in the presence of the agreement. A gate $G_{29}$ transfers the fourth bit carry $C_4$ occurring during addition into the judge F/F J. Upon the development of (50) $C_4$ is sent to F/F J. $J=1$ in the presence of $C_4$. A flag flip flop FA has an input gate $G_{31}$ which provides outputs "1" and "0" upon the development of (52) and (53), respectively. An input gate $G_{32}$ is provided for setting the judge F/F J when the flag flip flop FA assumes "1". A flag flip flop $F_B$ also has an input gate $G_{33}$ which provides outputs "1" and "0" upon (55) and (56), respectively. An input gate $G_{34}$ for the judge flip flop J is adapted to transfer the contents of the flag flip flop $F_B$ into the F/F J upon the development of (52). An input gate $G_{44}$ to the judge F/F J is enabled to transfer an input $\alpha$ in response to (68). To An input gate $G_{35}$ associated with the judge F/F J is provided for transmission of the contents of the input $\beta$ upon 19. When $\beta=1$, $J=1$. An output gate $G_{45}$ from the accumulator ACC transfers the contents of the accumulator ACC to the data input output terminals DIO of the display data storage DRM in response to (73). An input gate $G_{35}$ associated with the input of the accumulator ACC is provided for transferring the output of the adder $AD_4$ upon (26) and transferring the contents of the accumulator ACC after inverted via an inverter $IV_5$ upon (27). The contents of the memory RAM are transferred upon (28), the operand $I_A$ upon (13), the 4 bit input contents $k_1$-$k_4$ upon (57), the contents of the stack register SA upon (59) and the data from the data storage DRM via DIO upon (72). A stack register SA provides the output outside the present system. A stack register SC also provides the output outside the system. An input gate $G_{37}$ associated with the stack register SA transfers the contents of accumulator ACC upon (58). An input gate $G_{38}$ associated with the stack register SX transfers the contents of the temporary register upon X (58). A program stack register SP has an input gate $G_{39}$ for loading the contents of the program counter PL plus "1" through the adder into the program stack register, upon (60).

An illustrative example of the instruction codes contained within the ROM of the CPU structure, the name and function of the instruction codes and the control instructions developed pursuant to the instruction codes will now be tabulated in Table 1 wherein A: the instruction codes, B: the instruction name, C: the instruction description and D: the CPU control instructions.

TABLE 1

| | A | B | D |
|---|---|---|---|
| 1 | $I_O$ | SKIP | (42) |
| 2 | $I_O$ | AD | (23), (26) |
| 3 | $I_O$ | ADC | (23), (26), (23), (1) |
| 4 | $I_O$ | ADCSK | (23), (26), (25), (50), (1) |
| 5 | $I_O$ $I_A$ | ADI | (24), (26), (50) |
| 6 | $I_O$ $I_A$ | DC | (24), (26), (50) |
| 7 | $I_O$ | SC | (21) |
| 8 | $I_O$ | RC | (22) |
| 9 | $I_O$ $I_A$ | SM | (2) |
| 10 | $I_O$ $I_A$ | RM | (3) |
| 11 | $I_O$ | COMA | (27) |
| 12 | $I_O$ $I_A$ | LDI | (13) |
| 13 | $I_O$ $I_A$ | L | (28), (8) |
| 14 | $I_O$ $I_A$ | LI | (28), (8), (15), (10), (43) |
| 15 | $I_O$ $I_A$ | XD | (28), (8), (14), (15), (10), (44) |
| 16 | $I_O$ $I_A$ | X | (28), (4), (8) |
| 17 | $I_O$ $I_A$ | XI | (28), (4), (8), (15), (10), (43) |
| 18 | $I_O$ $I_A$ | XD | (28), (4), (8), (14), (16), (10), (44) |
| 19 | $I_O$ $I_A$ | LBLI | (11) |
| 20 | $I_O$ $I_A$ $I_B$ | LB | (8), (12) |
| 21 | $I_O$ $I_A$ | ABLI | (16), (10), (43) |
| 22 | $I_O$ $I_A$ | ABMI | (6), (7) |
| 23 | $I_O$ $I_A$ | T | (20) |
| 24 | $I_O$ | SKC | (45) |
| 25 | $I_O$ $I_A$ | SKM | (46) |
| 26 | $I_O$ $I_A$ | SKBI | (48) |
| 27 | $I_O$ $I_A$ | SKAI | (47) |
| 28 | $I_O$ | SKAM | (49) |
| 29 | $I_O$ | $SKN_1$ | (36) |
| 30 | $I_O$ | $SKN_2$ | (37) |
| 31 | $I_O$ | $SKF_1$ | (38) |
| 32 | $I_O$ | $SKF_2$ | (39) |
| 33 | $I_O$ | SKAK | (40) |
| 34 | $I_O$ | SKTAB | (41) |
| 35 | $I_O$ | SKFA | (51) |
| 36 | $I_O$ | SKFB | (54) |
| 37 | $I_O$ | WIS | (32) |
| 38 | $I_O$ | WIR | (33) |
| 39 | $I_O$ | NPS | (34) |
| 40 | $I_O$ | NPR | (35) |
| 41 | $I_O$ | ATF | (31) |
| 42 | $I_O$ | LXA | (29) |
| 43 | $I_O$ | XAX | (29), (30) |
| 44 | $I_O$ | SFA | (52) |

TABLE 1-continued

| | A | B | D |
|---|---|---|---|
| 45 | $I_O$ | RFA | (53) |
| 46 | $I_O$ | SFB | (55) |
| 47 | $I_O$ | RFB | (56) |
| 48 | $I_O$ | SFC | (17) |
| 49 | $I_O$ | RFC | (18) |
| 50 | $I_O$ | SFD | (62) |
| 51 | $I_O$ | RFD | (63) |
| 52 | $I_O$ | SFE | (65) |
| 53 | $I_O$ | RFE | (66) |
| 54 | $I_O$ | SKA | (68) |
| 55 | $I_O$ | SKB | (19) |
| 56 | $I_O$ | KTA | (57) |
| 57 | $I_O$ | STPO | (58) |
| 58 | $I_O$ | EXPO | (58), (59) |
| 59 | $I_O$ $I_A$ | TML | (62), (20) |
| 60 | $I_O$ | RIT | (61) |
| 61 | $I_O$ $I_A$ $I_B$ | LNI | (69) |
| 62 | $I_O$ | READ | (70), (72) |
| 63 | $I_O$ | STOR | (71), (73) |
| 64 | $I_O$ $I_A$ | EX | (28), (4), (75), (16) |
| 65 | $I_O$ | DECB | (74) |

Instruction Description Listed in Table 1

SKIP: Only the program counter PL is incremented without executing a next program step instruction, thus skipping a program step.

AD: A binary addition is effected on the contents of the accumulator ACC and the contents of the RAM, the addition results being loaded back into the accumulator ACC.

ADC: A binary addition is effected on the contents of the accumulator ACC, the memory RAM and the carry F/F C, the results being loaded back to the accumulator ACC.

ADCSK: A binary addition is effected on the contents of the accumulator ACC, the memory RAM and the carry flip flop C, the results being loaded into the accumulator ACC. If the fourth bit carry $C_4$ occurs in the results, then a next program step is skipped.

ADI: A binary addition is achieved upon the contents of the accumulator ACC and the operand $I_A$ and the results are loaded into the accumulator ACC. If the fourth bit carry $C_4$ is developed in the addition results, then a next program step is skipped.

DC: The operand $I_A$ is fixed as "1010" (a decimal number "10") and a binary addition is effected on the contents of the accumulator ACC and the operand $I_A$ in the same way as in the ADI instruction. The decimal number 10 is added to the contents of the accumulator ACC, the results of the addition being loaded into ACC.

SC: The carry F/F C is set ("1" enters into C).

RC: The carry F/F C is reset ("0" enters into C).

SM: The contents of the operand $I_A$ are decoded to give access to a desired bit position of the memory specified by the operand ("1" enters).

RM: The contents of the operand $I_A$ are interpreted to reset a desired bit position of the memory specified by the operand ("0" enters).

COMA: The respective bits of the accumulator ACC are inverted and the resulting complement to "15" is introduced into ACC.

LDI: The operand $I_A$ enters into the accumulator ACC.

L: The contents of the memory RAM are sent to the accumulator ACC and the operand $I_A$ to the file address counter BM.

LI: The contents of the memory RAM are sent to the accumulator ACC and the operand $I_A$ to the memory file address counter BM. At this time the memory digit address counter BL is incremented. If the contents of BL agree with the preselected value $n_1$, then a next program step is skipped.

LD: The contents of the memory RAM are exchanged with the contents of ACC and the operand $I_A$ is sent to the memory file address counter BM. The memory digit address counter BL is decremented. In the event that the contents of BL agree with the preselected value $n_2$, then a next program step is skipped.

X: The contents of the memory RAM are exchanged with the contents of the accumulator ACC and the operand $I_A$ is loaded into the memory file address counter BM.

XI: The contents of the memory RAM are exchanged with the contents of the accumulator ACC and the operand $I_A$ is sent to the memory file address counter BM. The memory digit address counter BL is incremented. In the event that BL is equal to the preselected value $n_1$, a next program step is skipped.

XD: The contents of the memory RAM replaces the contents of the accumulator ACC, the operand $I_A$ being sent to the memory file address counter BM. The memory digit address counter BL at this time is incremented. If the contents of BL are equal to $n_2$, then a next program step is skipped.

LBLI: The operand $I_A$ is loaded into the memory digit address counter BL.

LB: The operand $I_A$ is loaded into the memory file address counter BM and the operand B to the memory digit address counter BL.

ABLI: The operand $I_A$ is added to the contents of the memory digit address counter BL in a binary addition fashion, the results being loaded back to BL. If the contents of BL are equal to $n_1$, then no next program step is carried out.

ABMI: The operand $I_A$ is added to the contents of the memory file address counter BM in a binary fashion, the results being into BM.

T: The operand $I_A$ is loaded into the program step counter PL.

SKC: If the carry flip flop C is "1", then no next program step is taken.

SKM: The contents of the operand $I_A$ are decoded and a next program step is skipped as long as a specific bit position of the memory specified by the operand $I_A$ assumes "1".

SKBI: The contents of the memory digit address counter BL are compared with the operand $I_A$ and a next succeeding program step is skipped when there is agreement.

SKAI: The contents of the accumulator ACC are compared with theoperand $I_A$ and if both are equal to each other a next program step is skipped.

SKAM: The contents of the accumulator ACC are compared with the contents of the RAM and if both are equal a next program step is skipped.

$SKN_1$: When the input $KN_1$ is "0", a next program step is skipped.

$SKN_2$: When the input $KN_2$ is "0", a next program step is skipped.

$SKF_1$: When the input $KF_1$ is "0", a next program step is skipped.

$SKF_2$: When the input $KF_2$ is "0", a next program step is skipped.

SKAK: When the input AK is "1", a next program step is skipped.

SKTAB: When the input TAB is "1", a next program step is skipped.

SKFA: When the flag F/F F/A assumes "1" a next program step is skipped.

SKFB: When the flag F/F $F_B$ assumes "1", a next program step is skipped.

SKFD: When the flag F/F $F_D$ assumes "1", a next program step is skipped.

SKFE: When the flag F/F $F_E$ assumes "1", a next program step is skipped.

WIS: The contents of the output buffer register W are one bit right shifted, the first bit position (the most significant bit position) receiving "1".

WIR: The contents of the output buffer register W are one bit right shifted, the first bit position (the most significant bit position being loaded with "0").

NPS: The output control F/F $N_p$ for the buffer register W is set ("1" enters).

NPR: The buffer register output control flip flop $N_p$ is reset ("0" enters therein).

ATF: The contents of the accumulator ACC are transferred into the output buffer register F.

LXA: The contents of the accumulator ACC are unloaded into the temporary register X.

XAX: The contents of the accumulator ACC are exchanged with the contents of the temporary register X.

SFA: The flage F/F FA is set (an input of "1").

RFA: The flag F/F FA is reset (an input of "0").

SFB: The flag flip flop $F_B$ is set (an input of "1").

RFB: The flag flip flop $F_B$ is reset (an input of "0").

SFC: An input testing flag F/F $F_C$ is set (an input of "1").

RFC: The input testing flag F/F $F_C$ is reset (an input of "0").

SFD: The input testing flag F/F $F_D$ is set (an input of "1").

RFD: The input testing flag F/F $F_D$ is reset (an input of "0").

SFE: The input testing flag F/F $F_E$ is set (an input of "1").

RFE: The input testing flag F/F $F_E$ is reset (an input of "0").

SKA: When an input $\alpha$ is "1", a next program step is skipped.

SKB: When an input $\beta$ is "1", a next program step is skipped.

KTA: The inputs $k_1$–$k_4$ are introduced into the accumulator ACC.

STPO: The contents of the accumulator ACC are sent to the stack register SA and the contents of the temporary register X to the stack register SX.

EXPO: The contents of the accumulator ACC are exchanged with the stack register SA and the contents of the temporary register X with the stack register SX.

TML: The contents of the program counter $P_L$ incremented by one are transferred into the program stack register SP and the operand $I_A$ into the program counter $P_L$.

RIT: The contents of the program stack register SP are transmitted into the program counter $P_L$.

$LN_1$: The operands $I_A$ and $I_B$ enter the display and key input controlling flag F/Fs $N_1$ and $N_2$, respectively.

READ: Data externally applied to $D_{I/O}$ are introduced into the accumulator ACC.

STOR: The contents of the accumulator ACC are unloaded into $D_{I/O}$.

EX: The contents of the memory RAM are exchanged with that of the accumulator ACC and an exclusive-OR'ed output of the operand $I_A$ and the contents of the memory file address counter $B_M$ is supplied to $B_M$.

DECB: The memory digit address counter $B_L$ is decremented by "1". When the contents of $B_L$ are equal to the preset value $n_2$, a next instruction is skipped.

Table 2 sets forth the relationship between the operation codes contained within the ROM of the CPU structure and the operand.

TABLE 2

| | | |
|---|---|---|
| AD | → | 0001011000 ($I_O$) |
| COMA | → | 0001011111 ($I_O$) |
| SKBI | → | 000110 ($I_O$) 0010 ($I_A$) |
| LB | → | 01 ($I_O$) 001010 ($I_A$) 11 ($I_B$)<br>↓ to $G_7$<br>↓ to $DC_5$ |

wherein $I_O$: the operation codes and $I_A$, $I_B$: the operands

Taking an example wherein the output of the read only memory ROM is 10 bit long, the instruction decoder $DC_5$ decides whether the instruction AD or COMA (see Table 1) assumes "0001011000" or "0001011111" and develops the control instructions ㉓, ㉖, or ㉗. SKBI is identified by the fact that the upper six bits assume "000110", the lower 4 bits "0010" being treated as the operand $I_A$ and the remaining ninth and tenth bits "11" as the operand $I_B$. The operand forms part of instruction words and specifies data and addresses for next succeeding instructions and can be called an address area of an instruction. Major processing operations (a processing list) of the CPU structure will now be described in sufficient detail.

PROCESSING LIST (I) A same numeral N is loaded into a specific region of the memory RAM (NNN→X)

(II) A predetermined number of different numerals are loaded into a specific region of the memory ($N_1$, $N_2$, $N_3$, . . . →X)

(III)The contents of a specific region of the memory are transferred into a different region of the memory (X→Y)

(IV)The contents of a specific region of the memory are exchanged with that of a different region (X→Y)

(V) A given numeral N is added or subtracted in a binary fashion from the contents of a specific region of the memory (X±N)

(VI) The contents of a specific region of the memory are added in a decimal fashion to the contents of a different region (X±Y)

(VII)The contents of a specific region of the memory are one digit shifted (X right, X left)

(VIII) A one bit conditional F/F associated with a specific region of the memory is set or reset (F set, F reset)

(IX) The state of the one bit conditional F/F associated with a specific region of the memory is sensed and a next succeeding program address is changed according to the results of the state detection.

(X) It is decided whether the digit contents of a specific region of the memory reach a preselected numeral and a next succeeding program step is altered according to the results of such decision.

(XI) It is decided whether the plural digit contents of a specific region of the memory are equal to a preselected numeral and a program step is altered according to the results of the decision.

(XII) It is decided whether the digit contents of a specific region of the memory are smaller than a given value and a program step to be next executed is changed according to the decision.

(XIII) It is decided whether the contents of a specific region of the memory are greater than a given value and the results of such decision alter a program step to be next executed.

(XIV) The contents of a specific region of the memory are displayed.

(XV) What kind of a key switch is actuated is decided.

(XVI) The external memory is shifted digit by digit within the same memory file address.

The above processing events in (I)-(XVI) above are executed according to the instruction codes step by step in the following manner.

(I) PROCEDURE OF LOADING A SAME VALUE A INTO A SPECIFIC REGION OF THE MEMORY (NNN → X)

(Type 1)

| | | | |
|---|---|---|---|
| $P_1$ | LB | $m_A$ | $n_E$ |
| $P_2$ | LBI | N | |
| $P_3$ | XD | $n_A$ | |
| $P_4$ | T | $P_2$ | |

P: Step (Type 2)

| | | | |
|---|---|---|---|
| $P_1$ | LB | $m_B$ | $n_C$ |
| $P_2$ | LDI | N | |
| $P_3$ | XD | | |

(Type 3)

| | | | |
|---|---|---|---|
| $P_1$ | LB | $m_C$ | $n_C$ |
| $P_2$ | LDI | N | |
| $P_3$ | XD | $m_C$ | |
| $P_4$ | SKBI | $n_A$ | |
| $P_5$ | T | $P_2$ | |

(II) PROCEDURE OF LOADING A PREDETERMINED NUMBER OF DIFFERENT VALUES INTO A SPECIFIC REGION OF THE MEMORY ($N_1, N_2, N_3, \ldots \rightarrow X$)

(Type 1)

| | | | |
|---|---|---|---|
| $P_1$ | LB | $m_A$ | $n_E$ |
| $P_2$ | LDI | $N_1$ | |
| $P_3$ | XI | $m_A$ | |
| $P_4$ | LDI | $N_2$ | |
| $P_5$ | XI | $m_A$ | |
| $P_6$ | LDI | $N_3$ | |
| $P_7$ | XI | $m_A$ | |
| $P_8$ | LDI | $N_4$ | |
| $P_9$ | XI | $m_A$ | |

(Type 2)

| | | | |
|---|---|---|---|
| $P_1$ | LDI | N | |
| $P_2$ | LXA | | |

(III) PROCEDURE OF TRANSFERRING THE CONTENTS OF A SPECIFIC REGION OF THE MEMORY TO A DIFFERENT REGION OF THE MEMORY (X → Y)

(Type 1)

-continued

| | | | |
|---|---|---|---|
| $P_1$ | LB | $m_A$ | $n_E$ |
| $P_2$ | L | $m_B$ | |
| $P_3$ | XI | $m_A$ | |
| | T | $P_2$ | |

(Type 2)

| | | | |
|---|---|---|---|
| $P_1$ | LB | $m_B$ | $n_C$ |
| $P_2$ | L | $m_C$ | |
| $P_3$ | LBLI | $n_O$ | |
| $P_4$ | X | | |

(Type 3)

| | | | |
|---|---|---|---|
| $P_1$ | LB | $m_B$ | $n_C$ |
| $P_2$ | L | | |
| $P_3$ | LXA | | |

(Type 4)

| | | | |
|---|---|---|---|
| $P_1$ | LB | $m_B$ | $n_C$ |
| $P_2$ | L | $m_8$ | |
| $P_3$ | XAX | | |
| $P_4$ | X | | |

(IV) PROCEDURE OF EXCHANGING CONTENTS BETWEEN A SPECIFIC REGION OF THE MEMORY AND A DIFFERENCE REGION (X → Y)

(Type 1)

| | | | |
|---|---|---|---|
| $P_1$ | LB | $m_A$ | $n_E$ |
| $P_2$ | L | $m_B$ | |
| $P_3$ | X | $m_A$ | |
| $P_4$ | XI | $m_A$ | |
| $P_5$ | T | $P_2$ | |

(Type 2)

| | | | |
|---|---|---|---|
| $P_1$ | LB | $m_B$ | $n_C$ |
| $P_2$ | L | $m_C$ | |
| $P_3$ | LBLI | $n_O$ | |
| $P_4$ | X | $m_B$ | |
| $P_5$ | LBLI | $n_C$ | |
| $P_6$ | X | | |

(Type 3)

| | | | |
|---|---|---|---|
| $P_1$ | LB | $m_B$ | $n_C$ |
| $P_2$ | L | $m_C$ | |
| $P_3$ | X | $m_B$ | |
| $P_4$ | X | | |

(V) PROCEDURE OF EFFECTING A BINARY ADDITION OR SUBTRACTION OF A GIVEN VALUE N ONTO A SPECIFIC REGION OF THE MEMORY (Type 1) $M_1 + N \rightarrow M$

| | | | |
|---|---|---|---|
| $P_1$ | LB | $m_B$ | $n_C$ |
| $P_2$ | L | $m_B$ | |
| $P_3$ | ADI | N | |
| $P_4$ | X | | |

(Type 2) $X + N \rightarrow X$

| | | | |
|---|---|---|---|
| $P_1$ | XAX | | |
| $P_2$ | ADI | N | |
| $P_3$ | XAX | | |

(Type 3) $M_1 + N \rightarrow M_2$

| | | | |
|---|---|---|---|
| $P_1$ | LB | $m_B$ | $n_C$ |
| $P_2$ | L | $m_C$ | |
| $P_3$ | ADI | N | |
| $P_4$ | X | | |

(Type 4) $M_1 - N \rightarrow M_1$

| | | | |
|---|---|---|---|
| $P_1$ | LB | $m_B$ | $n_C$ |
| $P_2$ | SC | | |
| $P_3$ | LDI | N | |
| $P_4$ | COMA | | |
| $P_5$ | ADC | | |

-continued

| | | | | |
|---|---|---|---|---|
| $P_6$ | X | ↓ | | |

↓

(Type 5) $M_1 - N \rightarrow M_2$

↓

| | | | | | |
|---|---|---|---|---|---|
| $P_1$ | LB | ↓ | $m_B$ | $n_C$ | same as Type 4 ($P_1$–$P_5$) |
| $P_2$ | SC | | | | |
| $P_3$ | LDI | ↓ | N | | |
| $P_4$ | COMA | | | | |
| $P_5$ | ADC | | | | |
| $P_6$ | LB | ↓ | $m_C$ | $n_C$ | |
| $P_7$ | X | | | | |

↓

(Type 6)

↓

| | | | | |
|---|---|---|---|---|
| $P_1$ | LB | ↓ | $m_B$ | $n_C$ |
| $P_2$ | SC | | | |
| $P_3$ | LDI | ↓ | N | |
| $P_4$ | COMA | | | |
| $P_5$ | X | ↓ | $m_B$ | |
| $P_6$ | XAX | | | |
| $P_7$ | ADC | | | |
| $P_8$ | EXAX | | | |

↓

(Type 7) $N - M_1 \rightarrow M_1$

↓

| | | | | |
|---|---|---|---|---|
| $P_1$ | LB | ↓ | $m_B$ | $n_C$ |
| $P_2$ | SC | | | |
| $P_3$ | LDI | ↓ | N | |
| $P_4$ | X | ↓ | $m_B$ | |
| $P_5$ | COMA | | | |
| $P_6$ | ADC | | | |
| $P_7$ | X | ↓ | | |

↓

(Type 8) $N - M_1 \rightarrow M_2$

↓

| | | | | |
|---|---|---|---|---|
| $P_1$ | LB | ↓ | $m_B$ | $n_C$ |
| $P_2$ | L | ↓ | $m_C$ | |
| $P_3$ | COMA | | | |
| $P_4$ | ADI | ↓ | N + 1 | |
| $P_5$ | X | | | |

↓

(Type 9) $M \pm 1 \rightarrow M$

↓

| | | | | |
|---|---|---|---|---|
| $P_1$ | LDI | ↓ | 1 | |
| $P_{1'}$ | LDI | | F | |
| $P_2$ | LB | ↓ | $m_B$ | $n_C$ |
| $P_3$ | AD | | | |
| $P_4$ | X | | | |

↓

(VI) PROCEDURE OF EFFECTING A DECIMAL ADDITION OR SUBTRACTION BETWEEN A SPECIFIC REGION OF THE MEMORY AND A DIFFERENT REGION (Type 1) $X + W \rightarrow X$

↓

| | | | | |
|---|---|---|---|---|
| $P_1$ | LB | ↓ | $m_A$ | $n_E$ |
| $P_2$ | RC | | | |
| $P_3$ | L | ↓ | $m_B$ | |
| $P_4$ | ADI | ↓ | 6 | |
| $P_5$ | ADCSK | | | |
| $P_6$ | DC | | | |
| $P_7$ | XI | ↓ | $m_A$ | |
| $P_8$ | T | ↓ | $P_3$ | |

↓

(Type 2) $X - W \rightarrow X$

↓

| | | | | |
|---|---|---|---|---|
| $P_1$ | LB | ↓ | $m_A$ | $n_E$ |
| $P_2$ | SC | | | |
| $P_3$ | L | ↓ | $m_B$ | |
| $P_4$ | COMA | | | |
| $P_5$ | ADCSK | | | |
| $P_6$ | DC | | | |
| $P_7$ | XI | ↓ | $m_A$ | |
| $P_8$ | T | ↓ | $P_3$ | |

↓

(VII) PROCEDURE OF SHIFTING ONE DIGIT THE CONTENTS OF A SPECIFIC REGION OF THE MEMORY (Type 1) Right Shift

↓

| | | | | |
|---|---|---|---|---|
| $P_1$ | LB | ↓ | $m_A$ | $n_A$ |
| $P_2$ | LDI | ↓ | 0 | |
| $P_3$ | XD | ↓ | $m_A$ | |

-continued

| | | | | |
|---|---|---|---|---|
| $P_4$ | T | ↓ | $P_3$ | |

↓

(Type 2) Left Shift

↓

| | | | | |
|---|---|---|---|---|
| $P_1$ | LB | ↓ | $m_A$ | $n_E$ |
| $P_2$ | LDI | ↓ | 0 | |
| $P_3$ | XI | ↓ | $m_A$ | |
| $P_4$ | T | ↓ | $P_3$ | |

(VIII) PROCEDURE OF SETTING OR RESETTING A ONE-BIT CONDITION F/F ASSOCIATED WITH A SPECIFIC REGION OF THE MEMORY (Type 1)

↓

| | | | | |
|---|---|---|---|---|
| $P_1$ | LB | ↓ | $m_A$ | $n_C$ |
| $P_2$ | SM | ↓ | N | |

↓

(Type 2)

↓

| | | | |
|---|---|---|---|
| $P_1$ | RM | ↓ | N |

↓

(IX) PROCEDURE OF SENSING THE STATE OF THE ONE-BIT CONDITIONAL F/F ASSOCIATED WITH A SPECIFIC REGION OF THE MEMORY AND CHANGING A NEXT PROGRAM ADDRESS (STEP) AS A RESULT OF THE SENSING OPERATION

↓

| | | | | |
|---|---|---|---|---|
| $P_1$ | LB | ↓ | $m_B$ | $n_C$ |
| $P_2$ | SKM | ↓ | N | |
| $P_3$ | T | ↓ | $P_n$ | |
| $P_4$ | | $OP_1$ | | |
| $P_n$ | | $OP_2$ | | |

↓

(X) PROCEDURE OF DECIDING WHETHER THE DIGIT CONTENTS OF A SPECIFIC REGION OF THE MEMORY REACH A PRESELECTED NUMERAL AND ALTERING A NEXT PROGRAM ADDRESS (STEP) ACCORDING TO THE RESULTS OF THE DECISION

↓

| | | | | |
|---|---|---|---|---|
| $P_1$ | LB | ↓ | $m_B$ | $n_C$ |
| $P_2$ | L | | | |
| $P_3$ | SKAI | ↓ | N | |
| $P_4$ | T | ↓ | $P_n$ | |
| $P_5$ | | $OP_1$ | | |
| $P_n$ | | $OP_2$ | | |

↓

(XI) PROCEDURE OF DECIDING WHETHER THE PLURAL DIGIT CONTENTS OF A SPECIFIC REGION OF THE MEMORY ARE EQUAL TO A PRESELECTED NUMERAL AND ALTERING A PROGRAM STEP ACCORDING TO THE RESULTS OF THE DECISION

↓

| | | | | |
|---|---|---|---|---|
| $P_1$ | LB | ↓ | $m_B$ | $n_E$ |
| $P_2$ | LDI | ↓ | N | |
| $P_3$ | SKAM | | | |
| $P_4$ | T | ↓ | $P_n$ | |
| $P_5$ | ABLI | ↓ | 1 | |
| $P_6$ | T | ↓ | $P_3$ | |
| $P_7$ | | $OP_1$ | | |
| $P_n$ | | $OP_2$ | | |

↓

(XII) PROCEDURE OF DECIDING WHETHER THE CONTENTS OF A SPECIFIC REGION OF THE MEMORY ARE SMALLER THAN A GIVEN VALUE AND DECIDING WHICH ADDRESS (STEP) IS TO BE EXECUTED

↓

| | | | | |
|---|---|---|---|---|
| $P_1$ | LB | ↓ | $m_B$ | $n_C$ |
| $P_2$ | L | | | |
| $P_3$ | ADI | ↓ | 16-N | |
| $P_4$ | T | ↓ | $P_n$ | |
| $P_5$ | | $OP_1$ | | |
| $P_n$ | | $OP_2$ | | |

↓

(XIII) PROCEDURE OF DECIDING WHETHER THE CONTENTS OF A SPECIFIC REGION OF THE MEMORY ARE GREATER THAN A GIVEN VALUE AND DECIDING WHICH ADDRESS (STEP) IS TO BE EXECUTED

↓

| | | | | |
|---|---|---|---|---|
| $P_1$ | LB | ↓ | $m_B$ | $n_C$ |
| $P_2$ | L | | | |

-continued

| | | | |
|---|---|---|---|
| $P_3$ | ADI | ↓ | 15-N |
| $P_4$ | T | ↓ | $P_n$ |
| $P_5$ | | $OP_1$ | |
| $P_n$ | | $OP_2$ | |
| | | ↓ | |

(XIV) PROCEDURE OF DISPLAYING THE CONTENTS OF A SPECIFIC REGION OF THE MEMORY (Type 1)

| | | | | |
|---|---|---|---|---|
| | | ↓ | | |
| $P_1$ | LDI | ↓ | $n_1$ | |
| $P_2$ | WIR | | | |
| $P_3$ | ADI | ↓ | 1111 | |
| $P_4$ | T | ↓ | $P_6$ | |
| $P_5$ | T | | $P_2$ | |
| $P_6$ | LB | ↓ | $m_A$ | $n_A$ |
| $P_7$ | WIS | | | |
| $P_8$ | LD | ↓ | $m_A$ | |
| $P_9$ | ATF | | | |
| $P_{10}$ | NPS | | | |
| | | ↓ | | |
| | | ↓ | | |
| $P_{11}$ | LDI | ↓ | $n_2$ | |
| $P_{12}$ | ADI | ↓ | 1111 | |
| $P_{13}$ | T | ↓ | $P_{15}$ | |
| $P_{14}$ | T | ↓ | $P_{12}$ | |
| $P_{15}$ | NPR | | | |
| $P_{16}$ | WIR | | | |
| $P_{17}$ | SKBI | ↓ | $n_E$ | |
| $P_{18}$ | T | ↓ | $p_8$ | |
| $P_{19}$ | SKFA | | | |
| $P_{20}$ | T | ↓ | $p_6$ | |
| | | ↓ | | |

$P_1$ The bit number $n_1$ of the buffer register W is loaded into ACC to reset the overall contents of the buffer register W for generating digit selection signals effective to drive a display panel on a time sharing basis.

$P_2$ After the overall contents of the register W are one bit shifted to the right, its first bit is loaded with "0". This procedure is repeated via $P_4$ until $C_4 = 1$ during $P_3$, thus resetting the overall contents of W.

$P_3$ The operand $I_A$ is decided as "1111" and AC + 1111 is effected (this substantially corresponds to ACC-1). Since ACC is loaded with $n_1$ during $P_1$, this process is repeated $n_1$ times. When the addition of "1111" is effected following ACC = 0, the fourth bit carry $C_4$ assumes "0". When this occurs, the step is advanced to $P_4$. Otherwise the step is skipped up to $P_5$.

$P_4$ When the fourth bit carry $C_4 = 0$ during ACC + 1111, the overall contents of W are reduced to "0" to thereby complete all the pre-display processes. The first address $P_6$ is set for the memory display steps.

$P_5$ In the event that the fourth bit carry $C_4 = 1$ during ACC + 1111, the overall contents of W have not yet reduced to "0". Under these circumstances $P_2$ is reverted to repeat the introduction of "0" into W.

$P_6$ The first digit position of the memory region which contains data to be displayed is identified by the file address $m_A$ and the digit address $n_A$.

$P_7$ After the contents of the register W for generating the digit selection signals are one bit shifted to the right, its first bit position is loaded with "1" and thus ready to supply the digit selection signal to the first digit position of the display.

$P_8$ The contents of the specific region of the memory are unloaded into ACC. The file address of the memory still remains at $m_A$, whereas the digit address is decremented for the next succeeding digit processing.

$P_9$ The contents of the memory is shifted from ACC to the buffer register F. The contents of the register F are supplied to the segment decoder SD to generate segment display signals.

$P_{10}$ To lead out the contents of the register W as display signals, the conditional F/F $N_p$ is supplied with "1" and placed into the set state. As a result of this, the contents of the memory processed during $P_9$ are displayed on the first digit position of the display.

$P_{11}$ A count initial value $n_2$ is loaded into ACC to determine a one digit long display period of time.

$P_{12}$ ACC-1 is carried out like $P_3$. When ACC does not assume "0" (when $C_4 = 1$) the step is skipped up to $P_{14}$.

$P_{13}$ A desired period of display is determined by counting the contents of ACC during $P_{12}$. After the completion of the counting $P_{15}$ is reached from $P_{13}$. The counting period is equal in length to a one-digit display period of time.

$P_{14}$ Before the passage of the desired period of display the step is progressed from $P_{12}$ to $P_{14}$ with skipping $P_{13}$ and jumped back to $P_{12}$. This procedure is repeated.

$P_{15}$ $N_p$ is reset to stop supplying the digit selection signals to the display. Until $N_p$ is set again during $P_{10}$, overlapping display problems are avoided by using the adjacent digit signals.

$P_{16}$ The register W is one bit shifted to the right and its first bit position is loaded with "0". "1" introduced during $P_7$ is one bit shifted down for preparation of the next succeeding digit selection.

$P_{17}$ It is described whether the ultimate digit of the memory to be displayed has been processed and actually whether the value $n_E$ of the last second digit has been reached because the step $P_8$ of $B_L - 1$ is in effect.

$P_{18}$ In the event that ultimate digit has not yet been reached, $P_8$ is reverted for the next succeeding digit display processing.

$P_{19}$ For example, provided that the completion of the display operation is conditional by the flag F/F FA, FA = 1 allows $P_{20}$ to be skipped, thereby concluding all the displaying steps.

$P_{20}$ If FA = 1 at $P_{19}$, the display steps are reopened from the first display and the step is jumped up to $P_6$.

(Type 2)

| | | | | |
|---|---|---|---|---|
| | | ↓ | | |
| $P_1$ | LDI | ↓ | $n_1$ | |
| $P_2$ | WIR | | | |
| $P_3$ | ADI | ↓ | 1111 | |
| $P_4$ | T | ↓ | $P_6$ | |
| $P_5$ | T | ↓ | $P_2$ | |
| $P_6$ | LB | ↓ | $m_A$ | $n_A$ |
| $P_7$ | LD | ↓ | $m_A$ | |
| $P_8$ | LXA | | | |
| $P_9$ | LD | ↓ | $m_A$ | |
| $P_{10}$ | STPO | | | |
| | | ↓ | | |
| | | ↓ | | |
| $P_{11}$ | WIS | | | |
| $P_{12}$ | NPS | | | |
| $P_{13}$ | LDI | ↓ | $n_2$ | |
| $P_{14}$ | ADI | ↓ | 1111 | |
| $P_{15}$ | T | ↓ | $P_{17}$ | |
| $P_{16}$ | T | ↓ | $P_{14}$ | |
| $P_{17}$ | NPR | | | |
| $P_{18}$ | WIR | | | |
| $P_{19}$ | SKBI | | | |
| $P_{20}$ | T | ↓ | $P_7$ | |
| | | ↓ | | |

$P_1$ The bit number $n_1$ of the buffer register W is loaded into ACC to reset the overall contents of the buffer register W for generating digit selection signals -continued

| | |
|---|---|
| | effective to drive a display panel on a time sharing basis. |
| $P_2$ | After the overall contents of the register W are one bit shifted to the right, its first bit is loaded with "0". This procedure is repeated via $P_4$ until $C_4 = 1$ during $P_3$, thus resetting the overall contents of W. |
| $P_3$ | The operand $I_A$ is decided as "1111" and AC + 1111 is effected (this substantially corresponds to ACC-1). Since ACC is loaded with $n_1$ during $P_1$, this process is repeated $n_1$ times. When the addition of "1111" is effected following ACC = 0, the fourth bit carry $C_4$ assumes "0". When this occurs, the step is advanced to $P_4$. Otherwise the step is skipped up to $P_5$. |
| $P_4$ | When the fourth bit carry $C_4 = 0$ during ACC + 1111, the overall contents of W are reduced to "0" to thereby complete all the pre-display processes. The first address $P_6$ is set for the memory display steps. |
| $P_5$ | In the event that the fourth bit carry $C_4 = 1$ during ACC + 1111, the overall contents of W have not yet reduced to "0". Under these circumstances $P_2$ is reverted to repeat the introduction of "0" into W. |
| $P_6$ | The upper four bits of the first digit position of the memory region which contains data to be displayed are identified by the file address $m_A$ and the digit address $m_A$. |
| $P_7$ | The contents of the specific region of the memory are unloaded into ACC. The file address of the memory still remains at $m_A$, whereas the digit adress is decremented to specify the lower four bits. |
| $P_8$ | The contents of ACC, the upper four bits, are transmitted into the temporary register X. |
| $P_9$ | The contents of the specific region of the memory are unloaded into ACC. The file address of the memory still remains at $m_A$, whereas the digit address is decremented to specify the upper four bits of the next succeeding digit. |
| $P_{10}$ | The contents of ACC are unloaded into the stack register SA and the contents of the temporary register X into the stack register SX. |
| $P_{11}$ | After the contents of the register W for generating the digit selection signals are one bit shifted to the right, its first bit position is loaded with "1" and thus ready to supply the digit selection signal to the first digit position of the display. |
| $P_{12}$ | To lead out the contents of the register W as display signals, the conditional F/F $N_p$ is supplied with "1" and placed into the set state. As a result of this, the contents of the memory processed during $P_{10}$ are displayed on the first digit position of the display. |
| $P_{13}$ | A count initial value $n_2$ is loaded into ACC to determine a one digit long display period of time. |
| $P_{14}$ | ACC − 1 is carried out like $P_3$. When ACC assumes "0" $P_{15}$ is reached and when ACC = 0 (when $C_4 = 1$) the step is skipped up to $P_{16}$. This procedure is repeated. |
| $P_{15}$ | A desired period of display is determined by counting the contents of ACC during $P_{14}$. After the completion of the counting $P_{17}$ is reached from $P_{15}$. The counting period is equal in length to a one-digit display period of time. |
| $P_{16}$ | Before the passage of the desired period of display the step is progressed from $P_{14}$ to $P_{16}$ with skipping $P_{15}$ and jumped back to $P_{14}$. This procedure is repeated. |
| $P_{17}$ | $N_p$ is reset to stop supplying the digit selection signals to the display. Until $N_p$ is set again during $P_{10}$, overlapping display problems are avoided by using the adjacent digit signals. |
| $P_{18}$ | The register W is one bit shifted to the right and its first bit position is loaded with "0". "1" introduced during $P_7$ is one bit shifted down for preparation of the next succeeding digit selection. |
| $P_{19}$ | It is decided whether the ultimate digit of the memory to be displayed has been processed and actually whether the value $n_E$ of the last second digit has been reached because the step $p_9$ of $B_L - 1$ is in effect. |
| $P_{20}$ | In the event that ultimate digit has not yet been reached, $P_7$ is reverted for the next succeeding digit display processing. |

(XV) PROCEDURE OF DECIDING WHICH KEY SWITCH IS ACTUATED (SENSING ACTUATION OF ANY KEY DURING DISPLAY)

| | | |
|---|---|---|
| $P_1$ | LDI | |
| $P_6$ | LB | |
| $P_8$ | LD | |
| $P_{17}$ | SKBI | |
| $P_{18}$ | T | $P_B$ |
| $P_{19}$ | SFC | |
| $P_{20}$ | SKN | |
| $P_{21}$ | T | $P_{30}$ |
| $P_{22}$ | $SKN_2$ | |
| $P_{23}$ | T | $P_{30}$ |
| $P_{24}$ | $SKF_1$ | |
| $P_{25}$ | T | $P_{30}$ |
| $P_{26}$ | $SKF_2$ | |
| $P_{27}$ | T | $P_{30}$ |
| $P_{28}$ | RFC | |
| $P_{29}$ | T | $P_6$ |
| $P_{30}$ | LBLI | $n_1$ |
| $P_{31}$ | $SKN_1$ | |
| | to $P_{32}$ | |
| $P_{32}$ | T | $P_A$ |
| $P_{33}$ | $SKN_2$ | |
| $P_{34}$ | T | $P_B$ |
| $P_{35}$ | $SKF_1$ | |
| $P_{36}$ | T | $P_C$ |
| $P_{37}$ | $SKF_2$ | |
| $P_{38}$ | T | $P_D$ |
| $P_{39}$ | LI | $m_A$ |
| $P_{40}$ | $SKN_1$ | |
| $P_{41}$ | T | $P_E$ |
| $P_{42}$ | $SKN_2$ | |
| | $SKF_2$ | |
| | T | $P_X$ |
| to $P_1$ $P_A$ | | |
| $P_X$ | T | $P_1$ |
| $P_B$ | | |
| to $P_1$ | | |
| $P_y$ | | |
| $P_z$ | T | $P_1$ |

| | |
|---|---|
| $P_1$–$P_{18}$ | The display processes as discussed in (XIV) above. |
| $P_{19}$ | After the overall digit contents of the register W are displayed, the flag F/F FC is set to hold all the key signals $I_1$–$I_n$ at a "1" level. |
| $P_{20}$ | The step is jumped to $P_{30}$ as long as any one of the keys connected to the key input $KN_1$ is actuated. |
| $P_{22}$–$P_{27}$ | It is decided whether any one of the keys |

-continued

| | |
|---|---|
| | each connected to the respective key inputs $KN_2$ - $KF_2$ and in the absence of any actuation the step is advanced toward the next succeeding step. To the contrary, the presence of the key actuation leads to $P_{30}$. |
| $P_{28}$ | When any key is not actuated, F/F FC is reset to thereby complete the decision as to the key actuations. |
| $P_{29}$ | The step is jumped up to $P_6$ to reopen the display routine. |
| $P_{30}$ | When any key is actually actuated, the memory digit address is set at $n_1$ to generate the first key strobe signal $I_1$. |
| $P_{31}$ | It is decided if the first key strobe signal $I_1$ is applied to the key input $KN_1$ and if not the step is advanced toward $P_{33}$. |
| $P_{32}$ | When the first key strobe signal $I_1$ is applied to the key input $KN_1$, which kind of the keys is actuated is decided. Thereafter, the step is jumped to $P_A$ to provide proper controls according to the key decision. After the completion of the key decision the step is returned directly to $P_1$ to commence the displaying operation again ($P_z$ is to jump the step to $P_1$) |
| $P_{33}$-$P_{38}$ | It is sequentially decided whether the keys coupled with the first key strobe signal $I_1$ are actuated. If a specific key is actuated, the step jumps to $P_B$-$P_D$ for providing appropriate controls for that keys. |
| $P_{39}$ | This step is executed when no key is coupled. |

(XVI) PROCEDURE OF SHIFTING THE EXTERNAL MEMORY DIGIT BY DIGIT WITHIN THE SAME MEMORY FILE ADDRESS

| | | | | |
|---|---|---|---|---|
| $P_1$ | LB | ↓ | mA | nE |
| $P_2$ | | LXA | | |
| $P_3$ | | READ | | |
| $P_4$ | | XAX | | |
| $P_5$ | | STOR | | |
| $P_6$ | | XAX | | |
| $P_7$ | | DECB | | |
| $P_8$ | T | ↓ | $P_2$ | |

| | |
|---|---|
| $P_1$ | The file address $m_A$ and the digit address $n_E$ of the memory step $P_5$ are selected. |
| $P_2$ | The contents of the accumulator ACC are loaded in the register X for the time being. |
| $P_3$ | ACC is loaded with the contents specified at the step $P_1$. |
| $P_4$ | The contents of the register X set all during the step $P_2$ are returned to the accumulator ACC through exchange between the both. |
| $P_5$ | The memory as specified by $P_1$ is loaded with the contents of ACC. |
| $P_6$ | The contents of the register X are transmitted into ACC through the exchange process. |
| $P_7$ | The digit address counter is decremented. By defining the final digit value as "$n_2$" the file selected at the step $n_2$ is shifted as a whole. |
| $P_8$ | The program address is set at the step $P_2$ and the steps $P_2$-$P_7$ are repeatedly executed until BL = $n_2$. |

The foregoing is the description of the respective major processing events in the CPU architecture.

Figure 5:
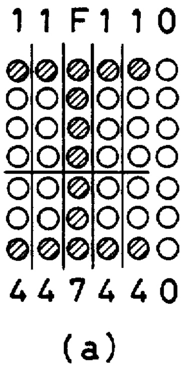
FIGS. 5A and 5B depict a typical display state with a display panel of a $5 \times 7$ dot matrix.

By reference to FIG. 5 an example of the display operation implementing the present invention will now be decribed in detail. For example, if the displaying of a character "I" is desired, each display panel digit being of a 7×5 dot matrix is divided into an upper half and a lower half and encoded information is defined as "11F1144744" in the descending order. This is accomplished by sending selected ones of the segment signals S1-S126 and selected ones of the opposite electrode signals H1-H7 to dot positions necessary for the displaying of the character "I". As indicated in FIG. 5(*b*), each digit 0, 1, 2, . . . 9, A, B, . . . F of the encoded information consists of their unique combination of 4 bits. The enabling waveform signals and disabling waveform signals are provided when the respective bits have "1" and "0", respectively.

Figure 6:
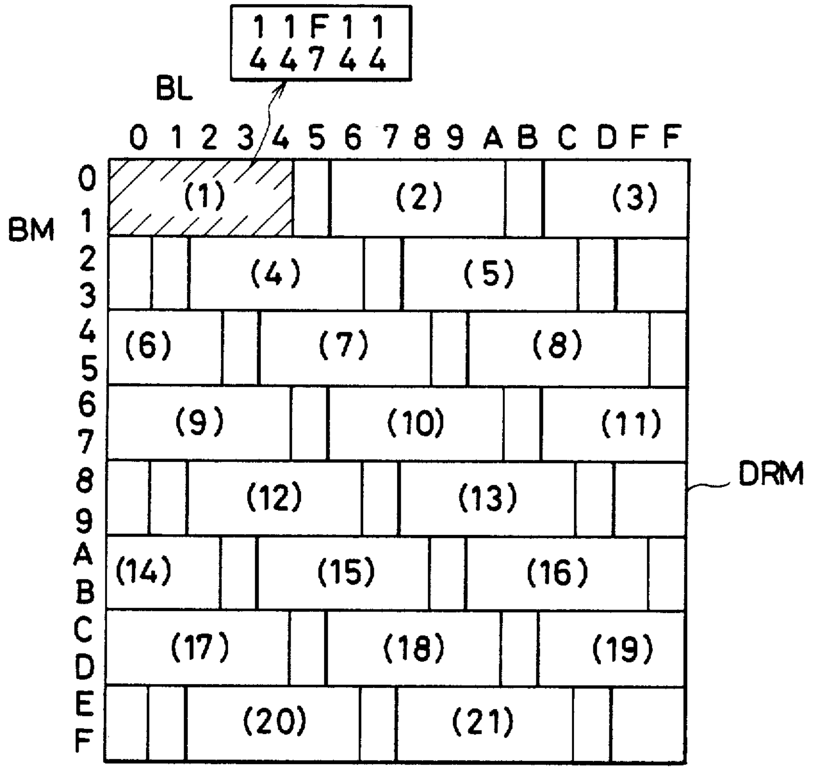
FIG. 6 shows a storage area in a display data store station DRM.

The display data storage section DRM as shown in FIG. 6 is for temporarily storing those display encoded data. The respective segments (1)-(21) store independently the encoded information characteristic of characters to be displayed. In the illustrated example, the segment (1) stores the encoded information "11F1144744" associated with the character "I".

The display data storage section DRM has a 21 digit capacity.

Of those digits the 12 digit long data contained within the segments (1)-(12) in FIG. 6 may appear on the display panel DSP at a time. Additionally, 21 digit long data may be stored in the external memory unit MU in the same manner as in FIG. 6. It is therefore possible to display a total of 42 digits on the display panel DSP with accompanying shift operation through a combination of the display data storage section DRM and the external memory unit MU.

Figure 7:
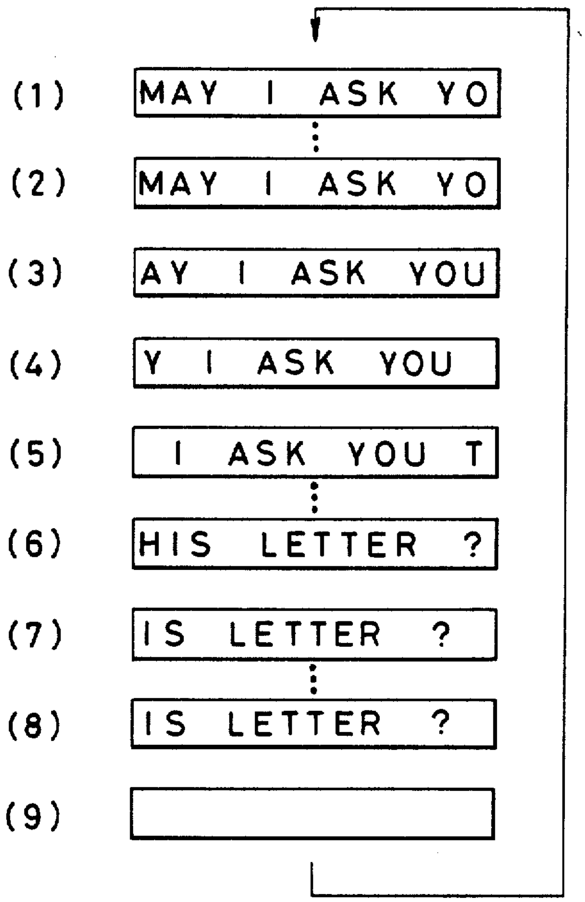
FIG. 7 shows the development of a display method according to the present invention.

FIG. 7 is a typical display state of the display panel DSP. In order to display of a full message consisting of multi characters longer than the maximum possible display of 12 digits, "MAY I ASK YOU TO POST THIS LETTER ?", the maximum possible digits are first displayed at a time as depicted in FIG. 7(1) and held for a given length of time as depicted in FIGS. 7(1) to 7(2). Thereafter, the characters are shifted digit by digit as depicted in FIGS. 7(3)-7(7).

To repeat the displaying of this sentence, the state of FIG. 7(7) is held for a limited period of time as shown in FIG. 7(8). The final characters of the sentence are held in this manner so that it becomes easier to appreciate the end of the message. As indicated in FIG. 7(9) the overall message then disappears from the display panel for a time and the displaying of the sentence resumes.

Figure 8:
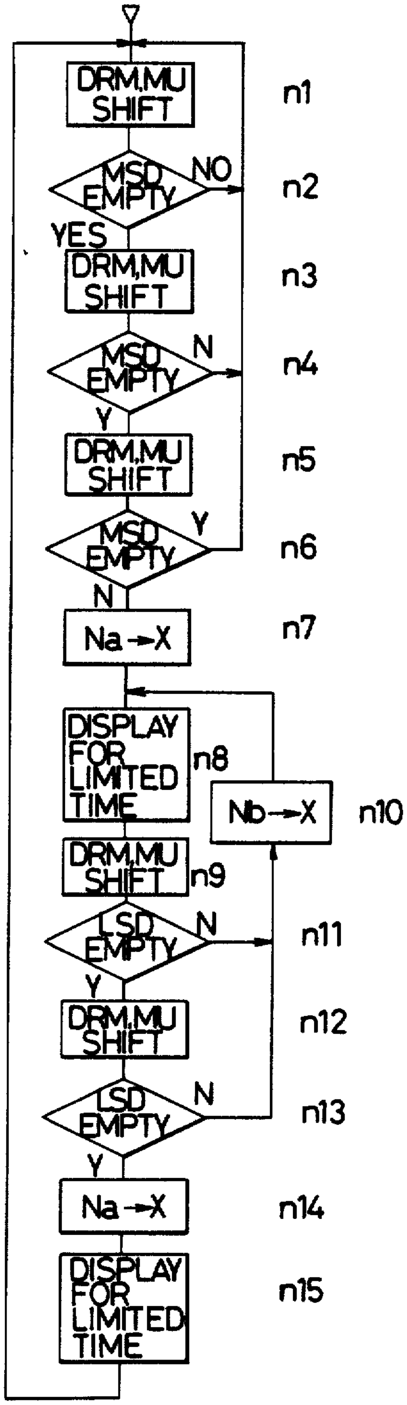
FIG. 8 is a flow chart illustrating events occurring within the display method shown in FIG. 7.

FIG. 8 is a flow chart for achieving the display operation in FIG. 7. The steps $n_1$-$n_4$ are executed to place the leading portion of the sentence to be displayed in alignment with the left extremity of the display in the shifting direction. The steps $n_7$ and $n_8$ or $n_{10}$ or $n_8$ are to perform display operation. The effect of the steps $n_9$, $n_{11}$, $n_{12}$ and $n_{13}$ is to place the end of the sentence in alignment with the right extremity of the display in FIG. 7 in the shifting direction. Likewise the steps $n_{14}$ and $n_{15}$ the steps $n_7$ and $n_8$ have the same effect of holding the display contents for the limited period of time.

During the step $n_1$ the contents of the display data storage section DRM in the display control circuitry DSC and those of the external memory unit MU are shifted by one digit or 6 dots. The step $n_2$ decides whether the segment (1) in the display data storage section DRM in FIG. 6 corresponding to the leading digit position is vacant. The steps $n_3$ and $n_4$ do the same job.

Each sentence has a total number of characters and spaces no greater than 40. Each space is no more than one character long. If the vacant space lasts for more than one character, the display operation proceeds with the steps $n_5$ and $n_6$. Provided that the step $n_6$ senses a character after one vacant space, the step $n_7$ would be in effect whereby a given value Na is fed into the register X. The step $n_8$ holds this stage of operation for the length of time corresponding to the given value Na. In this manner, the display states as depicted in FIGS. 7(1) and 7(2) are ensured.

The effect of the steps $n_{11}$ and $n_{13}$ is to determine the contents of segment (13) of the display data storage section DRM corresponding to the second last digit position along the shifting direction. A chain of the steps $n_9$, $n_{11}$, $n_{12}$ and $n_{13}$ senses if the vacant space persists for at least two digit positions. If not, the step $n_{10}$ is executed to supply the given value Nb to the register X. The present display state is held only for the limited period corresponding to the given value Nb and then shifted. This results in the display operation starting from FIG. 7(2) and ending at FIG. 7(7).

When the space lasts for two digit positions or more, the steps $n_{14}$ and $n_{15}$ hold the display state as shown in FIGS. 7(7) and (8) for the length of time as determined by the value Na. The display data then disappear from the panel for a while before execution of the steps $n_1$ through $n_7$. This is depicted in FIG. 7(9). The above mentioned procedure completes a cycle of the display operation according to the present invention.

Figure 9:
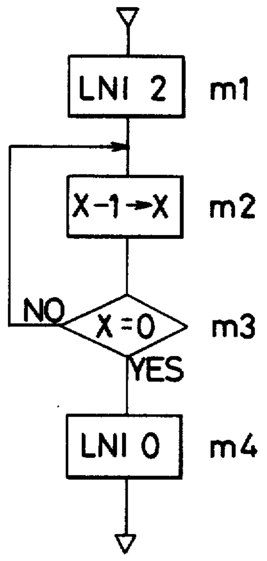
FIG. 9 is a flow chart showing the steps $n_8$ and $n_{15}$ in FIG. 8.

FIG. 9 details the steps $n_8$ and $n_{15}$ of FIG. 8 wherein the display operation is triggered by supplying the display/disable signal DIS to the display control circuitry DSC during the step $m_1$. At the next succeeding step $m_2$ the register X already loaded with the given value is decremented. The steps $m_2$ and $m_3$ are carried out repeatedly until $X=0$ at the step $m_3$. When $X=0$, the display/disable control signal DIS disables the display panel at the step $m_4$. The steps $m_2$ and $m_3$ correspond to the processing events (V) and (X).

Figure 10:
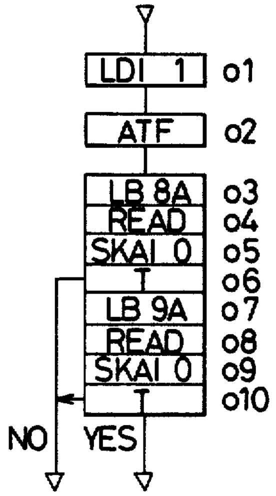
FIG. 10 is a flow chart showing details of the steps $n_{11}$ and $n_{13}$ in FIG. 8.

FIG. 10 details the steps $n_{11}$ and $n_{13}$ of FIG. 8 for deciding if the addresses BMBL: 8A and 9A of the display data storage section DRM are zero. It will be noted that BMBL: 8A means that the memory file address BM is "8" and the memory digit address BL is "A". BMBL:8A and BMBL:9A contain data corresponding to the intermediate longitudinal 8 dots of a chatacter to be displayed at the last digit position along the shifting position. All of the characters consisting of the $5\times7$ dot matrix except for special symbols may be displayed by actuating at least a dot in the intermediate longitudinal 7 dots. It can be regarded as vacant unless at least one of the intermediate longitudinal 7 dots of the $5\times7$ dot matrix are actuated.

Figure 11:
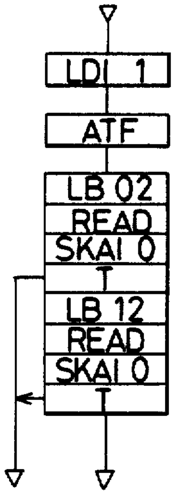
FIG. 11 is a flow chart showing details of the steps $n_2$, $n_4$ and $n_6$ in FIG. 8.

FIG. 11 shows the steps nhd 2, $n_4$ and $n_6$ of FIG. 8 in more detail. Those steps are to decide if the contents of the display data storage section DRM at the addresses BLBM: 02 and 12 are zero. These addresses correspond to the foremost digit position in the shifting direction. Those steps are carried out in the same manner as shown in FIG. 10.

It is appreciated that the steps $n_1$, $n_3$, $n_5$ and $n_{12}$ of FIG. 8 are effected based upon the processing events (22) and (3) of type 4 and the steps $n_7$, $n_{10}$ and $n_{14}$ based upon the processing event (2).

While the characters are shifted digit by digit in the above illustrated embodiment, they may be shifted dot by dot along the shifting direction as an alternative. In the case where a train of characters is displayed only once, the steps $n_{14}$ and $n_{15}$ of FIG. 8 may be eliminated.

Whereas the present invention has been described with respect to a specific embodiment, it will be understood that various changes and modifications will be suggested to one skilled in the art, and it is intended to encompass such changes and modifications as fall within the scope of the appended claims.

What is claimed is:

1. A method for displaying a message on a display panel, wherein said display has a capacity of a first number of characters and said message comprises a second number of characters greater than said first number, comprising the steps of:

displaying all characters of an initial portion of said message simultaneously on said panel, said initial portion comprising a number of characters equal to said first number, without any shifting of the characters in said initial portion on said display panel prior to said simultaneous display thereof;

maintaining the display of said initial portion for a predetermined first period of time;

shifting said display to sequentially display successive characters of said message on said display panel each for a predetermined second period of time of duration shorter than said first period of time;

displaying all characters of a final portion of said message simultaneously on said panel, said final portion comprising a number of characters equal to one less than said first number; and maintaining the display of said final portion for a predetermined third period of time of duration longer that said second period of time.

* * * * *